(12) United States Patent
Maguire

(10) Patent No.: US 7,124,879 B1
(45) Date of Patent: Oct. 24, 2006

(54) ENDLESS BELT

(75) Inventor: Dennis R. Maguire, Lucan (CA)

(73) Assignee: Maguire Super-Shield LTD, Ontario (CA)

( * ) Notice: Subject to any disclaimer, the term of this patent is extended or adjusted under 35 U.S.C. 154(b) by 0 days.

(21) Appl. No.: 11/181,761

(22) Filed: Jul. 15, 2005

(51) Int. Cl.
*B65G 13/02* (2006.01)
(52) U.S. Cl. .................... 198/690.2; 198/835
(58) Field of Classification Search ........... 198/638, 198/641, 690.2, 835, 847, 850, 853
See application file for complete search history.

(56) References Cited

U.S. PATENT DOCUMENTS

| | | | | |
|---|---|---|---|---|
| 874,982 | A | * | 12/1907 | Norton ............... 198/690.2 |
| 2,400,667 | A | * | 5/1946 | Toews ............... 144/250.12 |
| 2,812,052 | A | * | 11/1957 | Doyer ............... 198/626.6 |
| 3,349,893 | A | * | 10/1967 | Jordan et al. ......... 198/690.2 |
| 4,143,759 | A | * | 3/1979 | Paradis ............... 198/690.2 |
| 6,241,076 | B1 | | 6/2001 | Maguire |
| 6,371,280 | B1 | | 4/2002 | Lindner |
| 6,443,297 | B1 | * | 9/2002 | Johnston ............. 198/835 |
| 6,517,935 | B1 | * | 2/2003 | Kornfalt et al. ......... 428/331 |
| 6,615,976 | B1 | | 9/2003 | Maguire |
| 6,644,463 | B1 | | 11/2003 | Mott |
| 6,695,125 | B1 | | 2/2004 | Maguire |
| 2002/0175055 | A1 | | 11/2002 | Ryde |

* cited by examiner

*Primary Examiner*—James R. Bidwell
(74) *Attorney, Agent, or Firm*—Standley Law Group LLP

(57) ABSTRACT

A flexible endless belt mountable on rotating elements has an outer and inner surface between first and second lateral edges and a plurality of longitudinally spaced-apart laterally oriented upraised flights on the outer surface. Each flight has a single medial portion offset in a rearward longitudinal direction from portions of the flight immediately lateral to the medial portion. Protrusions on the inner surface engage the rotating elements for endlessly rotating the endless belt in a forward longitudinal direction. Such an endless belt is particularly useful on a control apparatus for a stone slinger.

19 Claims, 3 Drawing Sheets

ENDLESS BELT

FIELD OF THE INVENTION

The present invention is related to endless belts, preferably endless belts for assisting in transporting particulate material.

BACKGROUND OF THE INVENTION

Conveyors for moving particulate material, such as stone, gravel, sand, and the like, are known in the art. Such conveyors, commonly called "stone slingers", generally comprise a thrower belt mounted on a truck, the truck having a storage hopper for holding the particulate material. Particulate material is dispensed from the hopper on to the thrower belt and then transported along the thrower belt to be deposited in a desired locating remote from the truck.

Particulate material on the thrower belt has a tendency to bounce around and be thrown off in a premature and/or erratic manner. To control the flow of particulate material on the thrower belt, an endless belt positioned above the thrower belt may be used. Such an arrangement is disclosed in U.S. Pat. No. 6,241,076 issued Jun. 5, 2001, U.S. Pat. No. 6,615,976 issued Sep. 9, 2003 and U.S. Pat. No. 6,695,125 issued Feb. 24, 2004. While use of such an endless belt has improved control over particulate material on the thrower belt, there remains a need for an improved belt, particularly for such a use.

Various types of endless belts for various purposes are known in the art. For example, United States Publication 2002/0175055 published Nov. 28, 2002 discloses a conveyor belt having V-shaped grooves for transporting particulate material. This belt is designed to actually carry particulate material, hence the troughing of the belt, and would be poorly effective in a control apparatus for a stone slinger. U.S. Pat. No. 6,371,280 issued Apr. 16, 2002 discloses a conveyor belt having "wavy" flights for use on a crop baler. This belt is designed to grip a bale of crop. If used in a control apparatus on a stone slinger, the "waviness" of the belt would detrimentally affect object control as it would permit objects to escape off the sides of the thrower belt and objects would collect in several regions rather than just one. U.S. Pat. No. 6,644,463 issued Nov. 11, 2003 disclose a conveyor belt with two flights that are laterally spaced apart thereby having a gap in the middle. Such a belt is designed to carry objects, not control objects from above. If used on a control apparatus for a stone slinger, this belt would allow objects to slip back through the gap thus losing throwing effectiveness and control. Thus, the aforementioned belts are not well suited for use on a control apparatus positioned above particulate material for controlling particulate material on a thrower belt of a stone slinger. Furthermore, these belts, and other conveyor belts like them are flat on the underside and do not have means on the underside to permit engagement with rotational elements.

SUMMARY OF THE INVENTION

There is provided a flexible endless belt mountable on rotating elements comprising: an outer and inner surface between first and second lateral edges; a plurality of longitudinally spaced-apart laterally oriented upraised flights on the outer surface, each flight having a medial portion offset in a rearward longitudinal direction from portions of the flight immediately lateral to the medial portion; and, engagement means on the inner surface for engagement with the rotating elements for endlessly rotating the endless belt in a forward longitudinal direction.

Since the medial portion of the flight is rearwardly offset from the portions immediately lateral to it, the flight forms a natural "cup" that helps brings objects towards and holds objects in a central region of the belt. When the endless belt is disposed above a conveyor belt, for example a conveyor belt of a stone slinger, such an arrangement of flights on the endless belt provides much better control of objects being transported on the conveyor belt. Premature and erratic discharge of objects is greatly reduced as the objects are guided toward and held in the center of the conveyor belt by the endless belt.

Preferably, each flight extends laterally across the outer surface from the first lateral edge to the second lateral edge, thereby spanning the entire width of the endless belt. This helps ensure that objects at the very edges of the endless belt are guided towards the central region. Each flight has only one "cup" so that all of the objects collect in a single region, i.e. the central region, to ensure tighter control over objects being transported on the conveyor belt. Further, the flight at both the first and second lateral edges is forwardly offset from the medial portion so that objects on the conveyor belt are not thrown off one or both sides of the conveyor belt. The flights may be, for example, arcuate or chevron-shaped. Preferably, the flights are chevron-shaped with the vertex of the chevron pointing rearwardly against the direction of travel of the endless belt, and thus against the direction of flow of the objects on the conveyor belt. Preferably, each chevron-shaped flight extends from one lateral edge to the other with a single vertex pointing rearwardly.

Each flight has a leading edge and trailing edge extending laterally on the outer surface of the belt. The leading edge is longitudinally forward of the trailing edge, that is, the leading edge is in the direction of travel of the belt. In a preferred embodiment, the leading edge forms a first angle with the outer surface that is steeper than a second angle formed between the trailing edge and the outer surface. Thus, the flight is less sloped on the leading edge than the trailing edge and the flight is more capable of cupping objects without bending or breaking due to back-jamming of objects. To further mitigate against bending or breaking, the flight preferably has a middle portion that is thicker than the end portions, the end portions being laterally offset from the middle portion. Since the middle portion is the place where back-jamming is most likely to occur, a thicker middle portion considerably reduces the possibility of damage to the flight.

Each flight is also preferably higher at the middle portion than at the end portions. Such an arrangement is particularly advantageous since conveyor belts transporting objects are often channeled or sloped toward the center. Having flights on the endless belt that are higher at the middle portion means that the flight can extend farther into the sloped channel of the conveyor belt over which the endless belt is positioned. The flight of the endless belt more closely follows the contour of the conveyor belt thereby maintaining better control over objects on the conveyor belt.

Preferably, each flight has a top that is flat along at least part of the middle portion and that is parallel to the outer surface of the endless belt. The top of each flight tapers downwardly from the middle portion towards the lateral edges. Thus the height of the flight is greater at the center of the endless belt than at the edges. Flat middle portions provide greater stability to the endless belt when resting on a flat surface since the belt is not resting on a peak.

The outer surface of the endless belt preferably has a central region between two lateral regions, the central region being depressed in respect of the lateral regions. The depression is preferably slight, for example from 0.0625 inch to 0.25 inch deep, preferably about 0.125 inch. The depression assists in guiding objects from the lateral regions into the central regions where the objects are more tightly controlled.

The outer surface of the endless belt may have a plurality of laterally extending grooves between the flights. Such grooves permit the belt to flex more easily as it rides on the objects on the conveyor belt. The ability to flex is particularly important when the endless belt encounters an unusually large object. Easier flexing reduces the likelihood of delamination and tearing of the belt.

The flights of the endless belt bound spaces between them that are not partitioned into compartments, that is, there is no blockage from the first lateral edge to the second lateral edge in the space between two flights. Therefore, objects in the lateral region at the very edge of the endless belt can be guided without obstruction into the central region where control can be more easily maintained over the object.

The inner surface of the endless belt comprises engagement means for engaging the rotating elements to endlessly rotate the endless belt in a forward longitudinal direction. The forward longitudinal direction is the direction of motion of the surface of the endless belt that is in contact with the objects, which is also the direction of motion of the objects on the conveyor belt. Any suitable engagement means may be used. Selection of the type of engagement means depends on the type of rotating elements. In one embodiment, the rotating elements are preferably wheels having sprockets elements attached thereon. The inner surface of the endless belt rides on the wheels and the engagement means engages the sprocket elements. Where sprocket elements are used, the engagement means may be, for example, protrusions on the inner surface of the endless belt. The size and shape of the protrusions are designed to efficiently engage the sprocket elements. Protrusions may be aligned in longitudinal rows. Preferably, there are two or more spaced-apart longitudinal rows. Preferably the two or more spaced-apart longitudinal rows are laterally-aligned so that the protrusions are aligned both longitudinally and laterally. More preferably, there are four spaced-apart longitudinal rows of protrusions.

Alignment of the endless belt on the rotating elements may be maintained by alignment means. Alignment means may be part of the rotating elements, part of a frame on which the rotating elements are mounted, and/or part of the endless belt itself. Preferably, the inner surface of the endless belt comprises the alignment means. In one embodiment, the alignment means may be protrusions on the inner surface that prevent the belt from slipping sideways off the rotating elements. Where the rotating elements are wheels or wheels together with attached sprocket elements, the protrusions are preferably laterally inward from the wheels. Laterally inward means closer to the center of the endless belt. Preferably, there are no protrusions laterally outward of the wheels so that the lateral edges of the endless belt can bend inward to accommodate larger objects without interfering with the motion of the wheels. This reduces chatter and reduces belt wear. Protrusions may be aligned in longitudinal rows. Preferably, there are two or more spaced-apart longitudinal rows. Preferably the two or more spaced-apart longitudinal rows are laterally-aligned so that the protrusions are aligned both longitudinally and laterally. More preferably, there are four spaced-apart longitudinal rows of protrusions.

In a preferred embodiment, the rotating elements are wheels having sprocket elements attached laterally inwardly thereon and the same protrusions on the inner surface of the endless belt function as both the engagement means and the alignment means. Each sprocket element engages one longitudinal row of protrusions. Since the longitudinal row of protrusions engaged by the sprocket elements is immediately laterally inwardly proximal the wheel to which the sprocket elements are attached, the longitudinal row of protrusions also acts to prevent the endless belt from slipping inwardly. Two such arrangements, one proximal the first lateral edge of the endless belt and the other proximal the second lateral edge, keep the endless belt aligned on the wheels.

The wheels may be driven by a driving means, for example a motor, preferably a hydraulic motor, thus driving the sprocket elements attached to the wheel and the endless belt engaged with the sprocket elements. In an embodiment having four laterally-aligned spaced-apart longitudinal rows of protrusions, two of the longitudinal rows may be closely spaced near the center of the endless belt so that a third wheel in the center may be used as either an idler wheel or a driving wheel for better tracking and/or extra drive.

The endless belt may comprise any suitably flexible material that is strong enough to withstand the forces involved in moving the objects on the conveyor belt. Preferably, the endless belt comprises a natural or synthetic rubber or elastomer. More preferably, the endless belt comprises a cloth casing laminated between layers of rubber. The flights on the outer surface and the engagement means and alignment means on the inner surface may be separate pieces attached to the endless belt, for example by screws, rivets and the like, or they may be a unitized part of the endless belt. Preferably, the endless belt is molded with the flights, engagement means and alignment means being integrally molded with the outer and inner surfaces. Preferably, the lateral edges of the endless belt are also molded to seal the cloth casing between the layers of rubber.

Objects that may be transported on a conveyor belt and controlled on the conveyor belt by an endless belt of the present invention are any relatively solid object, for example, vegetables (e.g. beans, potatoes, etc.) and particulate matter (e.g. stones, sand, rocks, gravel, etc.). Endless belts of the present invention are preferably used on control apparatuses for conveyors of particulate material (e.g. stone slingers). Such control apparatuses are described in U.S. Pat. No. 6,241,076 issued Jun. 5, 2001, U.S. Pat. No. 6,615,976 issued Sep. 9, 2003 and U.S. Pat. No. 6,695,125 issued Feb. 24, 2004, the disclosures of which are herein incorporated by reference in their entirety. The endless belt of the present invention advantageously provides unexpected improvement in the control of larger volumes of objects, in the control of a greater selection of object shapes, in the control of objects in a wider variety of weather conditions, or in any combination of the above. In the case of stone slingers, increased control over objects on the conveyor belt leads to an advantageous improvement in throw distance and accuracy.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Figure 1:
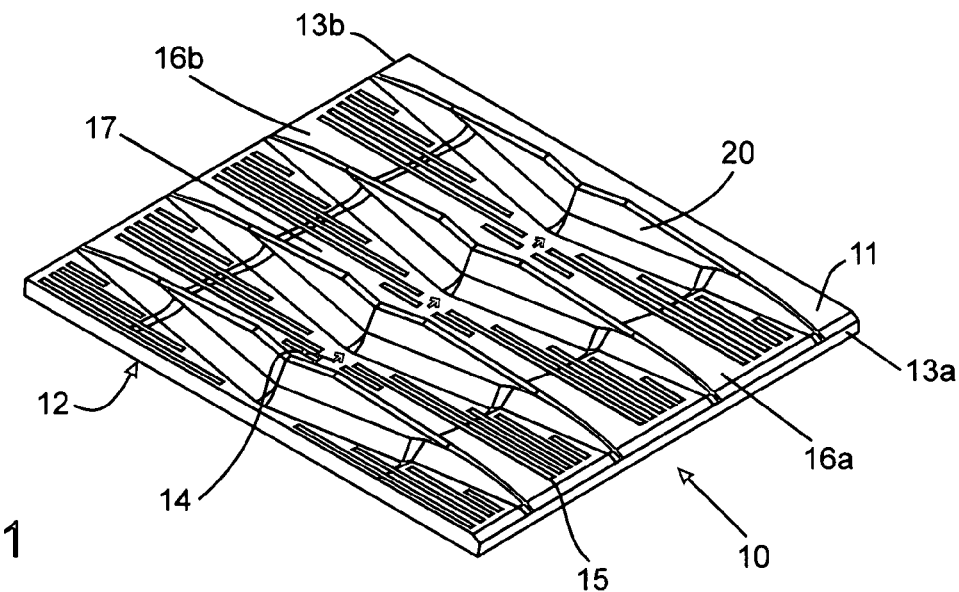
FIG. 1 is a top perspective view of a section of an endless belt of the present invention.

Referring to FIG. 1, a section of endless rubber belt 10 comprises outer surface 11 and inner surface 12. Molded integrally with outer surface 11 are a plurality of longitudinally spaced-apart laterally oriented upraised chevron-shaped flights 20 (four shown and one labeled) extending across the width of the belt from first lateral edge 13a to second lateral edge 13b. Forward longitudinal direction (i.e. direction of travel) of the endless belt is shown by arrows 14 molded into outer surface 11. A plurality of laterally-extending grooves 15 (only one labeled) between flights 20 permit the belt to flex more readily without breaking or delaminating. First and second lateral regions 16a,16b of the endless belt are 0.125 inch higher than central region 17, the central region being depressed relative to the lateral regions as better illustrated in FIG. 4. Lateral edges 13a,13b are integrally molded with the rubber outer and inner surfaces to seal the cloth casing of the belt between the outer and inner rubber surfaces. The space between flights 20 do not contain any obstructing walls or partitions so that there is an open channel from first lateral edge 13a to second lateral edge 13b between two flights.

Figure 2:
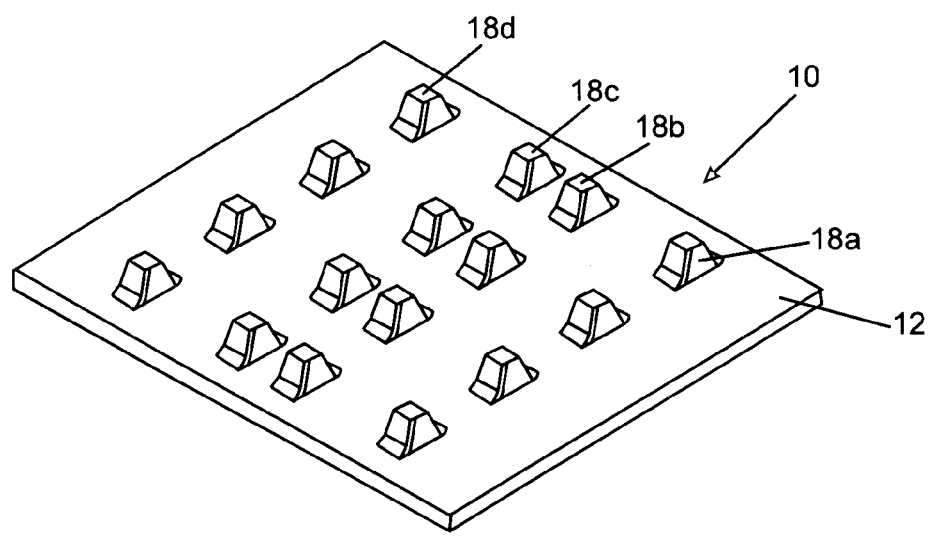
FIG. 2 is a bottom perspective view of the section of the endless belt depicted in FIG. 1.

Referring to FIG. 2, a bottom perspective view of the section of endless belt 10 depicted in FIG. 1 illustrates four laterally-aligned spaced-apart longitudinal rows of protrusions 18a,18b,18c,18d integrally molded with inner surface 12. Row of protrusions 18a functions as engagement means and alignment means in respect of wheels near one lateral edge and row of protrusions 18d functions as engagement means and alignment means in respect of wheels near the other lateral edge. Rows of protrusions 18a,18d would be laterally inward of their respective wheels. Rows of protrusions 18b, 18c would bracket and/or engage a single wheel proximal the center of the belt, if desired.

Figure 3:
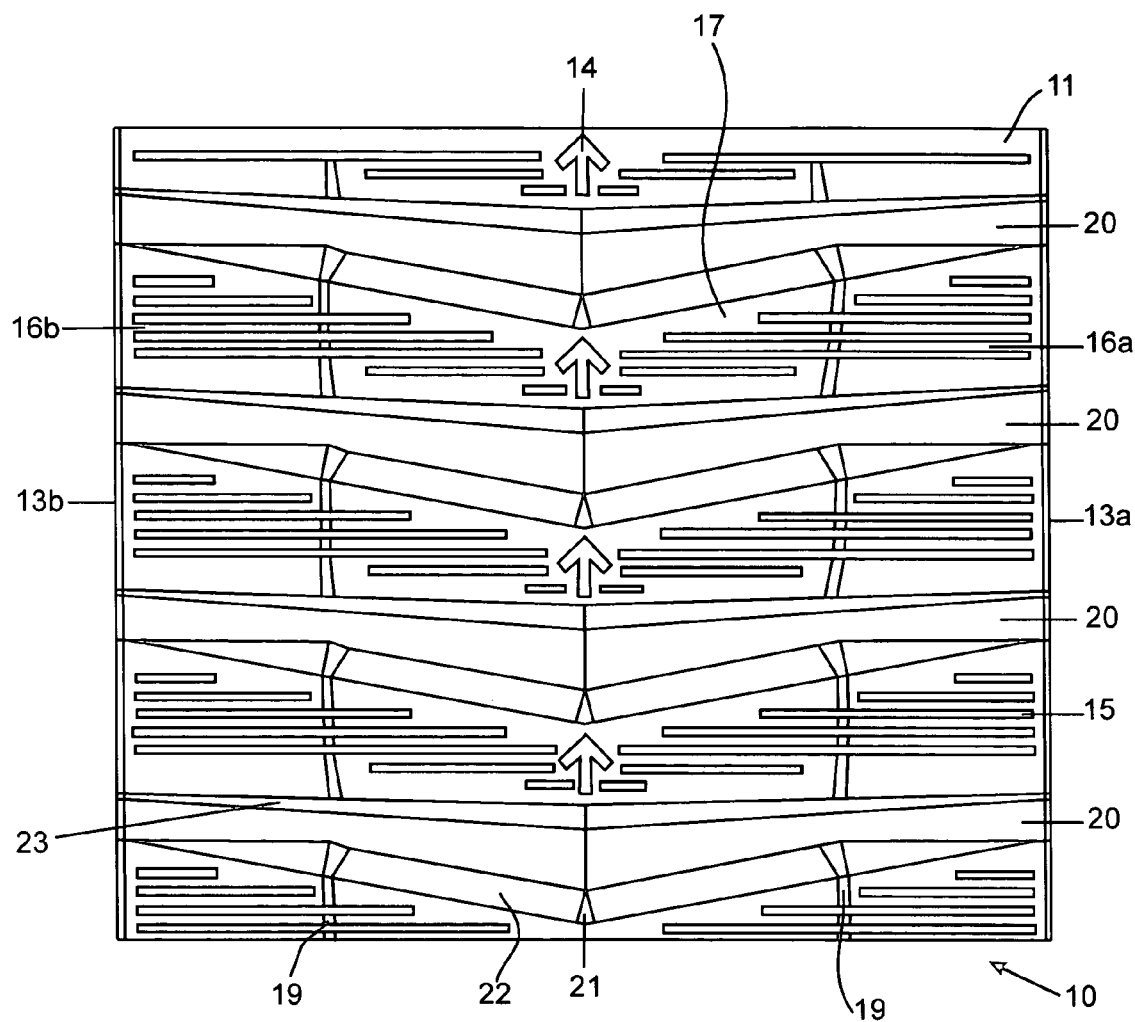
FIG. 3 is a top plan view of the section depicted in FIG. 1.

Referring to FIG. 3, a top view of the section depicted in FIG. 1 more clearly shows the chevron shape of flights 20 on outer surface 11 of endless belt 10. Vertices 21 (only one labeled) on trailing edges 22 (only one labeled) of flights 20 point against the direction of travel of endless belt 10 as represented by arrows 14 (only one labeled) molded into outer surface 11. Objects being controlled by endless belt 10 are guided into central region 17 by the chevron-shape of flights 20 and the difference in height between lateral regions 16a,16b and central region 17 where they are cupped in the "V"s of leading edges 22 (only one labeled) of the flights. Ridges 19 illustrate the boundary between lateral regions 16a,16b and central region 17.

Still referring to FIG. 3, each flight 20 is longitudinally thinner in lateral regions 16a,16b near lateral edges 13a,13b than in central region 17 near the center of the belt. Making flights 20 thicker in the central region provides reinforcement to the flights to reduce the possibility of the flights bending or breaking when objects are jammed against the flights. Laterally-extending grooves 15 (only one labeled) between flights 20 permit the belt to flex more readily without breaking or delaminating in response to larger objects.

Figure 4:
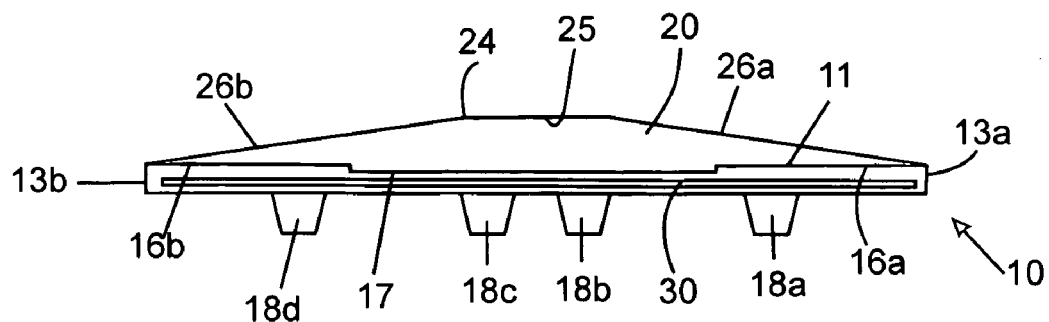
FIG. 4 is a schematic end cross-sectional view taken through one flight of the section of the endless belt depicted in FIG. 1.

Referring to FIG. 4, a schematic end cross-sectional view of the section of endless belt 10 illustrates the profile of a flight 20 from the rear. Top 24 in a medial portion 25 of flight 20 is flat and parallel to outer surface 11. Top 24 tapers downwardly in end portions 26a, 26b towards lateral edges 13a, 13b. Thus, the medial portion of each flight is higher than the laterally offset end portions. Central region 17 on outer surface 11 is depressed by 0.125 inch in relation to lateral regions 16a, 16b. Inner surface 12 comprises four integrally molded laterally-aligned spaced-apart longitudinal rows of protrusions 18a, 18b, 18c, 18d. Cloth casing 30 is laminated between rubber outer surface 11 and rubber inner surface 12 and sealed within endless belt 10 by integrally molded rubber lateral edges 13a, 13b.

Figure 5:
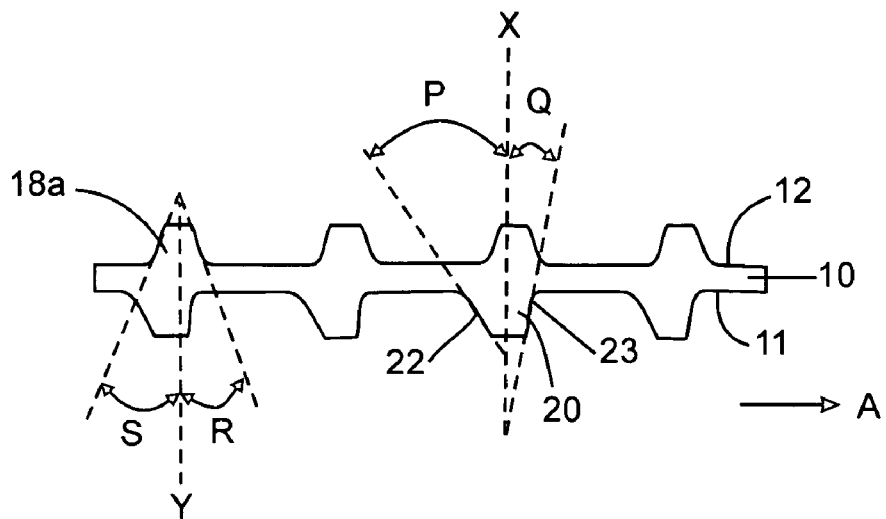
FIG. 5 is a schematic side view of the section of the endless belt depicted in FIG. 1; and, FIG. 6 is a schematic side view of an endless belt mounted on wheels.
Figure 6:
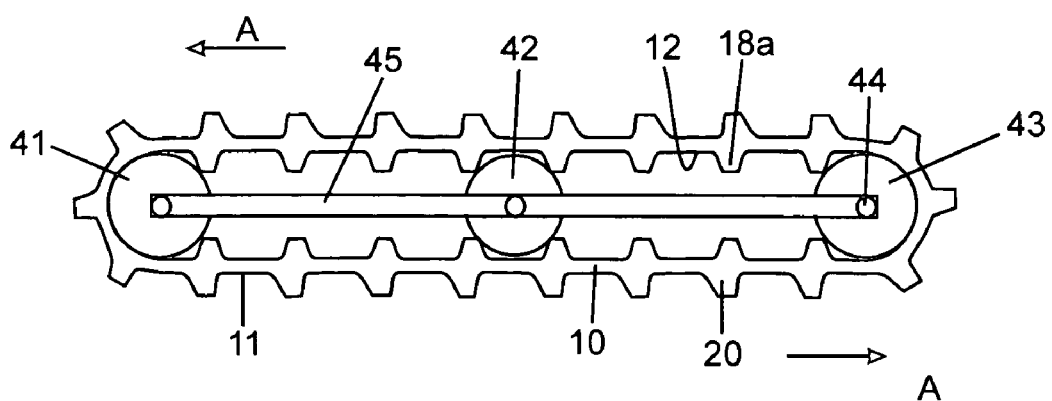

Referring to FIG. 5, a schematic side view of endless belt 10 illustrates the side profile of flights 20 (only one labeled) and protrusions 18a,18b,18c,18d (only 18a shown and only one labeled). Endless belt 10 is depicted in operating position above a conveyor belt (not shown), therefore the flights are depicted below the protrusions. FIG. 6 shows the endless belt mounted on wheels in the operating position. Forward longitudinal direction and direction of flow of objects is depicted by arrow A.

Still referring to FIG. 5, trailing edge 22 and leading edge 23 of flight 20, form angles P and Q, respectively, with normal X perpendicular to outer surface 11 and direction of flow A. Angle Q is set to provide effective trapping of objects against leading edge 23 and is preferably within a range of from about 5° to about 15°, more preferably about 10°. Angle P is set to provide effective reinforcement of flight 20 at trailing edge 22 and is preferably within a range of from about 20° to about 60°, more preferably about 30°. Thus, leading edge 23 forms a steeper angle than trailing edge 22 with respect to outer surface 11, which makes flight 20 more effective at trapping objects at the leading edge while providing better reinforcement at the trailing edge.

Still referring to FIG. 5, protrusion 18a has angled edges and a flat top. The edges form angles S and R with normal Y perpendicular to inner surface 12 and direction of flow A. Angles S and R may be the same or different and are set to efficiently engage sprockets on rotating elements driving the belt. Angles S and R are preferably in a range of from about 20° to about 30°, more preferably about 25°. Angles S and R are preferably the same.

Referring to FIG. 6, endless belt 10 having a plurality of flights 20 on outer surface 11 and longitudinal rows of laterally-aligned spaced-apart protrusions 18a (only one row shown) on inner surface 12 is mounted on sets of wheels 41,42,43. The sets of wheels are mounted on laterally extending axles 44 (only one labeled) mounted on a pair of longitudinal frame elements 45 (only one shown) of a frame. Sets of wheels 41 and 43 comprise two or more laterally space-apart wheels, one wheel located near one lateral edge of the belt and another wheel located near the other lateral edge of the belt. Set of wheels 42 may comprise one wheel or two or more laterally spaced-apart wheels. Endless belt 10 is driven in direction A by engagement of the longitudinal rows of protrusions with sprockets attached to the wheels of one or more of the sets of wheels. At least one set of wheels has drive wheels while the others may have drive or idler wheels. The drive wheels are driven by a motor or motors (not shown), preferably a hydraulic motor.

Other advantages which are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

The invention claimed is:

1. A flexible endless belt mountable on rotating elements comprising:
    an outer and inner surface between first and second lateral edges;
    a plurality of longitudinally spaced-apart laterally oriented upraised flights on the outer surface, each flight having a single medial portion and end portions, the medial portion offset in a rearward longitudinal direction from the end portions and from portions of the flight immediately lateral thereto, the medial portion thicker than the end portions; and
    engagement means on the inner surface for engagement with the rotating elements for endlessly rotating the endless belt in a forward longitudinal direction.

2. The endless belt of claim 1, wherein each flight has a leading edge and trailing edge extending laterally on the outer surface of the belt, the leading edge longitudinally forward of the trailing edge, the leading edge forming a first angle with the outer surface that is steeper than a second angle formed between the trailing edge and the outer surface.

3. The endless belt of claim 1, wherein the medial portion is higher than the end portions.

4. The endless belt of claim 3, wherein each flight has a top that is flat and parallel to the outer surface along at least part of the medial portion, and the top of each flight tapers downwardly in the end portions towards the lateral edges.

5. The endless belt of claim 1, wherein the outer surface has a central region between two lateral regions, the central region depressed in respect of the lateral regions.

6. The endless belt of claim 1, wherein the outer surface has a plurality of laterally extending grooves between the flights.

7. The endless belt of claim 1, wherein the belt comprises a cloth casing laminated between rubber layers, and first and second lateral edges are molded to seal the cloth casing between the rubber layers.

8. The endless belt of claim 1, wherein the flights bound spaces between the flights that are not partitioned into compartments.

9. The endless belt of claim 1, wherein each flight extends laterally across the outer surface from the first lateral edge to the second lateral edge.

10. The endless belt of claim 1, further comprising alignment means on the inner surface for maintaining alignment of the endless belt on the rotating elements.

11. The endless belt of claim 10, wherein the engagement means and the alignment means are the same and are two or more laterally-aligned spaced-apart longitudinal rows of protrusions laterally inward of the rotating elements.

12. The endless belt of claim 11, wherein the two or more longitudinal rows is four longitudinal rows.

13. The endless belt of claim 11, wherein the flights and the protrusions are integrally molded with the outer and inner surfaces.

14. A flexible endless belt mountable on rotating elements comprising:
    an outer and inner surface between first and second lateral edges;
    a plurality of longitudinally spaced-apart laterally oriented upraised chevron-shaped flights extending from the first lateral edge to the second lateral edge on the outer surface, each chevron-shaped flight having a single vertex pointing in a rearward longitudinal direction, each flight having a middle portion proximal the vertex and end portions laterally offset from the middle portion, the middle portion being thicker and higher than the end portions, each flight having a leading edge and trailing edge extending laterally on the outer surface of the belt, the leading edge being longitudinally forward of the trailing edge, the leading edge forming a first angle with the outer surface that is steeper than a second angle formed between the trailing edge and the outer surface, each flight having a top that is flat and parallel to the outer surface along at least part of the middle portion, the top of each flight tapering downwardly in the end portions towards the lateral edges; and,
    two or more laterally-aligned spaced-apart longitudinal rows of protrusions on the inner surface laterally inward of the rotating elements for engagement with the rotating elements for endlessly rotating the endless belt in a forward longitudinal direction and for maintaining alignment of the endless belt on the rotating elements.

15. The endless belt of claim 14, wherein the flights and the protrusions are integrally molded with the outer and inner surfaces.

16. The endless belt of claim 15, wherein the outer surface has a central region between two lateral regions, the central region depressed in respect of the lateral regions.

17. The endless belt of claim 16, wherein the outer surface has a plurality of laterally extending grooves between the flights.

18. The endless belt of claim 17, wherein the belt comprises a cloth casing laminated between rubber layers, and first and second lateral edges are molded to seal the cloth casing between the rubber layers.

19. The endless belt of claim 18, wherein the two or more longitudinal rows is four longitudinal rows.

\* \* \* \* \*